(12) United States Patent
Verma et al.

(10) Patent No.: US 11,631,245 B2
(45) Date of Patent: Apr. 18, 2023

(54) SMART GLASSES FOR PROPERTY EVALUATION USING AI AND ML

(71) Applicant: Bank of America Corporation, Charlotte, NC (US)

(72) Inventors: Sandeep Verma, Gurugram (IN); Shailendra Singh, Maharashtra (IN); Divya Sharma, Delhi (IN); Nandini Rathaur, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 196 days.

(21) Appl. No.: 17/349,006

(22) Filed: Jun. 16, 2021

(65) Prior Publication Data

US 2022/0405507 A1  Dec. 22, 2022

(51) Int. Cl.
| | | |
|---|---|---|
| G06V 20/00 | (2022.01) | |
| G06V 20/20 | (2022.01) | |
| G06N 3/08 | (2023.01) | |
| G06T 7/00 | (2017.01) | |
| G06V 40/20 | (2022.01) | |
| G06V 40/16 | (2022.01) | |
| G06F 18/214 | (2023.01) | |
| G06F 18/21 | (2023.01) | |
| G06N 3/045 | (2023.01) | |
| G06Q 30/02 | (2023.01) | |
| G06Q 50/16 | (2012.01) | |
| G06Q 40/03 | (2023.01) | |

(52) U.S. Cl.
CPC ............ *G06V 20/20* (2022.01); *G06F 18/214* (2023.01); *G06F 18/2178* (2023.01); *G06N 3/045* (2023.01); *G06N 3/08* (2013.01); *G06T 7/0002* (2013.01); *G06V 40/172* (2022.01); *G06V 40/28* (2022.01); *G06Q 30/0278* (2013.01); *G06Q 40/03* (2023.01); *G06Q 50/16* (2013.01); *G06T 2207/10016* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 2004/0228515 A1* | 11/2004 | Okabe | G06T 7/0004 382/145 |
| 2018/0247402 A1* | 8/2018 | Xie | G06T 19/006 |
| 2021/0303717 A1* | 9/2021 | Neves | G06V 40/165 |
| 2022/0004935 A1* | 1/2022 | Lakshmanan | G06N 7/01 |
| 2022/0292549 A1* | 9/2022 | Gowda | H04W 4/185 |

OTHER PUBLICATIONS

"Artificial Intelligence for Image Processing: Methods, Techniques and Tools," *How to Implement Artificial Intelligence for Solving Image Processing Tasks| Apriorit*, Apriorit, Sep. 17, 2020.
Zhang et al., "Self-Attention Generative Adversarial Networks," https://arxiv.org/pdf/1805.08318.pdf, Jun. 14, 2019.

* cited by examiner

*Primary Examiner* — Martin Mushambo
(74) *Attorney, Agent, or Firm* — Weiss & Arons LLP (57) ABSTRACT

Apparatus and methods for a smart glasses device are provided. The smart glasses device may execute a prediction model on video data captured by the smart glasses device to retrain the prediction model. The prediction model may be retrained in response to a data synchronization between an output of the prediction model and a gesture captured by the smart glasses device.

20 Claims, 5 Drawing Sheets

SMART GLASSES FOR PROPERTY EVALUATION USING AI AND ML

FIELD OF TECHNOLOGY

Aspects of the disclosure relate to providing apparatus and methods for use with smart glasses. In particular, the disclosure relates to apparatus and methods for using smart glasses in a real estate property evaluation using AI and ML.

BACKGROUND

When a person desires to purchase a home with a mortgage, a real estate appraiser is sent to the home to evaluate the state of the home. This evaluation is used to identify a value of the home.

It is not uncommon for an appraiser to miss one or two details that could alter the evaluation of the home, such as a crack in the wall, a leak in the ceiling, uneven floorboards, a narrow driveway, etc. Human bias can also be a reason for such mistakes.

It is desirable, therefore, to provide apparatus and methods that leverage machine learning and artificial intelligence to process images viewed by an appraiser during a home appraisal to identify suboptimal characteristics of the home and notify the appraiser of the identified characteristics.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for using smart glasses to process and tag data captured by a video camera embedded in a smart glasses device are provided. For the purposes of this disclosure, a smart glasses device, referred to alternately herein as "smart glasses," may be understood to mean wearable glasses including one or more internal processors. The one or more internal processors may include one or more microprocessors. In addition to the processors, the smart glasses may also include hardware components associated with conventional glasses. Such components may include a frame and lenses.

Other components of the smart glasses may include one or more displays, one or more cameras, one or more video cameras, one or more audio input devices, one or more audio output devices and/or one or more wired and/or wireless communication modules (e.g., Bluetooth®, Beacon®).

One or more software modules may execute on the processors. The one or more software modules may be stored in a memory located within the smart glasses. The one or more software modules may, in the alternative, be referred to as applications. The applications may enable the smart glasses to execute various tasks. Exemplary applications may include object recognition and running prediction models, as detailed below.

The display may display information alongside what the user sees through the lenses. The smart glasses display may be physically configured to add data alongside what the wearer sees through the lenses. In some embodiments, the smart glasses display may display data as an at least partially transparent overlay on top of the lenses. In some embodiments, the overlay may not be transparent. As such, the user may view, through the overlay, physical objects that are normally seen through lenses in addition to the overlay. Such a smart glasses display may be known as augmented realty.

The smart glasses may have the ability to modify its optical properties, such as tint and prescription of the lenses. The optical property modification may be executed at any given time. Smart glasses may change optical properties of the lenses by executing one or more software modules on the internal processors.

Various sensors may be included in the smart glasses. These sensors may include a GPS, a moisture sensor, a voltage meter, an accelerometer, a gyroscope, a touch pad and any other suitable sensors.

The smart glasses may include a nano wireless network interface card. The nano wireless network interface card may establish communication with a wireless network. The nano wireless network interface card may be operable to transmit a data packet over the wireless network. The data packet may transferred to a remote server.

The smart glasses may include a battery. The battery may be operable to power hardware components embedded in the smart glasses, such as the video camera, the microprocessor, the display and the nano wireless network interface card.

The smart glasses device may execute a prediction model on video data captured by the video camera. The smart glasses may retrain the prediction model in response to a data synchronization between an output of the prediction model and a gesture captured by the smart glasses device. The gesture may be captured in the video data.

The smart glasses may include the video camera. The video camera may be operable to record a video including frames. The frames may include a first frame and a plurality of second frames.

The smart glasses may include a database. The database may store the prediction model and training data. The prediction model may be a prediction algorithm. The training data may be data used to train the prediction algorithm. The training may include feeding the training data to a generic algorithm to compute the prediction algorithm. The prediction algorithm may be trained to identify a defective characteristic in an object. When the defective characteristic is a crack in a wall, the prediction algorithm may be computed by feeding a generic algorithm with training data including a plurality of cracks in walls. This may generate the prediction model, primed to identify a crack in a wall.

The smart glasses may include the microprocessor. The microprocessor may be operable to receive the first frame from the video camera and to process the first frame. The processing may include executing an object detection algorithm on the first frame to detect the object in the first frame. The object detection algorithm may be a Self-Attention Generative Adversarial Network ("SA GAN"). The object detection algorithm may detect the object. When the smart glasses device is being used by an appraiser in the process of inspecting a house, the object detection algorithm may detect objects having relevance to the appraiser's home inspection. Exemplary objects of relevance include a window, a door, a wall, a roof and a wall. Objects that are not of relevance, and thus not detectable by the object detection algorithm, may include movable objects in the house such as a couch, bookshelf, bed, and a television. The processing described herein of the first frame may be repeated for some or all frames captured by the video camera. For each frame processed, a plurality of frames captured after the frame may be analyzed to determine if they include a gesture as described herein.

The object detection algorithm may identify the object in the first frame. When the object detection algorithm identifies a plurality of objects, the object detection algorithm may identify one or more objects in the frame. The object detection algorithm may also identify a boundary circumscribing the object in the first frame. The object detection algorithm may associate the object with an object identifier. The object identifier may be associated with the object in the database.

Although it is described, for illustrative purposes, that an object is identified, it is to be understood that the object detection algorithm may process a frame and not identify an object in the frame. No action may be taken when no object is identified.

When the object detection algorithm identifies the object in the first frame, the microprocessor may run the prediction model on the first frame. Running the prediction model on the object may determine if the object includes a defective characteristic. Exemplary defective characteristics may include seepage, cracked wall, narrow parking, damaged wallpaper, damaged carpet, etc.

In illustrative embodiments, the object may be a wall, the defective characteristic may be a crack in the wall and the training data may a plurality of images of cracks in walls.

The prediction model may identify a single defective characteristic. In some of these embodiments, the database may include a plurality of prediction models, each prediction model being associated with one or more object identifiers. Running the prediction model on the object may include pulling one or more prediction models associated with the object identifier of the object and running the pulled models on the object.

The prediction model may identify two or more defective characteristics.

The prediction model may not identify a defective characteristic. When a defective characteristic is not identified, no action may be taken by the microprocessor.

When the prediction model is run on a frame that includes two or more identified objects, the running the prediction model may include retrieving all prediction models tagged with the object identifiers associated with the two or more identified objects.

In some embodiments, the frame may not be processed by the object detection algorithm. Instead, the frame may be fed directly to the prediction model for identification of one or more defective characteristics.

The object detection algorithm may detect a plurality of objects, the plurality of objects including the object. It is to be understood that the processing of the object described herein may be applied to two or more objects. Each of the objects may be associated with an object identifier.

When the defective characteristic is identified by the prediction model, the prediction model may output a classifier associated with the defective characteristic. The classifier may be referred to alternately herein as a defective classifier. In some embodiments, the classifier may be natural language describing the defective characteristic. For example, the classifier may be 'cracked wall' or 'broken roof'.

When the defective characteristic is identified by the prediction model, the prediction model may instruct the display to trigger an augmented reality display to a smart glasses user.

In response to the trigger, the display may generate the augmented reality display. The augmented reality display may circumscribe the object with a boundary. The boundary may be any suitable color. The augmented reality display may position the natural language associated with the defective classifier adjacent the boundary.

After triggering the augmented reality display, the microprocessor may search the plurality of second frames for a gesture indicating the data synchronization. The plurality of frames may be frames captured within a time span after the augmented reality display is generated. Exemplary time spans may include 30 seconds, 1 minute, 2 minutes and 3 minutes. The gesture may include body movements of the smart glasses user. Exemplary body movements include the waving of a hand, movement of a foot, movement of an arm, positioning one or two hands into a predefined shape, or any other suitable body movement.

In some embodiments, in place of a gesture, the smart glasses user may input an audio command into the smart glasses microphone. When the microprocessor identifies the audio command and within a time span after the augmented reality display is generated, data synchronization may be confirmed. Exemplary audio commands may include one or more of "yes", "that's right", "correct" or any other suitable audio commend.

For the purposes of the application, data synchronization may be a confirmation of an accuracy of the prediction output by the smart glasses user. In some embodiments, data synchronization may occur when the body movements are captured within the time span. In some embodiments, data synchronization may occur when the audio command is captured within the time span.

Thus, in home appraisal embodiments, the smart glasses may recognize input from the appraiser and correlate the input with data synchronization. The data synchronization may be an input, from the appraiser, confirming the defective characteristic of the object circumscribed by the boundary box. This may trigger retraining of the prediction model with new training data. The new training data may be the first frame, or the object circumscribed by the boundary box.

In response to identifying the gesture, the microprocessor may compile a data packet for transfer to a remove server via an internet connection. The data packet may include one or more of the first frame, the boundary overlaid on the object in the first frame, a time at which the video camera captured the first frame, the classifier and the object identifier. In some embodiments, the compiling the data packet may include using facial recognition technology to identify a face in the first frame and to blur the face in the first frame. In some embodiments, the data packet may store the first frame in read-only mode.

In response to the data synchronization, as described above, the microprocessor may update the training data in the database to include the first frame. Updating the training data may create new training data based on the identifying the gesture in the plurality of second frames. The new training data may include the previously stored training data and the first frame.

In response to the data synchronization, as described above, the microprocessor may update the training data in the database to include the object. The object may be extracted from the first frame by applying the boundary to the first frame and extracting the pixels within the boundary. The new training data may include the previously stored training data and the object.

The microprocessor may re-train the prediction model with the new training data. The re-trained prediction model may be referred to as an updated prediction model. This may create a more robust prediction model using training data whose accuracy has been verified by the smart glasses user. The methods may include receiving a third frame from the video camera. Methods described above for processing the first frame may be used to process the third frame. The processing of the third frame may include running the object detection algorithm on the third frame. The processing of the third frame may include running the updated prediction model on the third frame. A plurality of fourth frames, captured after the third frame, may be used to identify a gesture, etc., as described above with respect to the plurality of second frames. A plurality of fourth frames may be used to identify a gesture, the plurality of fourth frames being captured during the time span elapsing after the capture of the third frame.

In some embodiments, the smart glasses may not store the training data for the prediction model. In some of these embodiments, the remote server may store the prediction model and the training data. The data packet transmitted to the remote server may further comprise an instruction to the remote server to update the training data and to retrain the prediction model stored on the remote server using the new training data, the new training data including the first frame.

In embodiments when the smart glasses do not store in the training data, the remote server may retrain the prediction model as described above. The microprocessor may receive the updated prediction model from the remote server. The smart glasses device may overwrite the prediction model stored on the smart glasses device with the updated prediction model. This bifurcated system may reduce a computational load on the smart glasses device by pushing the retraining of the model to the remote server, which supports greater database and processing capacities.

In some embodiments, the smart glasses may be part of an Internet of Things ("IoT") system. The IoT system may comprise a central hub and an IoT node. The central hub may be the remote server. The IoT node may be the smart glasses device.

The IoT system may retrain the prediction model in response to a data synchronization between the output of the prediction model and the gesture captured by the smart glasses device. The IoT system may include the smart glasses device supporting an internet connection and include a video camera for recording the video. The video may include a first frame and a plurality of second frames.

The smart glasses may process the first frame using tiny machine learning ("ML"). The microprocessor may execute the processing. The tiny ML may include executing an object detection algorithm on the first frame to detect an object in the first frame. For the purposes of the application, tiny ML may refer to machine learning processes that can be performed on the microprocessor without surpassing the microprocessor's processing capacities.

The processing may identify the object and a boundary circumscribing the object in the first frame using the object detection algorithm. The microprocessor may compile a data packet for transfer to the central hub via the internet connection. The data packet may include the first frame, a tag tagged to the first frame identifying the object, and a time at which the video camera captured the first frame. The tag may include the object identifier.

Compiling the data packet may include using facial recognition technology to identify a face in the first frame and to blur the face in the first frame. The data packet may include the first frame in a read-only mode.

The central hub may store the prediction model and the training data in a database. The prediction model may be primed to identify a defective characteristic in the object. The prediction model may be associated with the tag.

Upon receipt of the first frame, the central hub may extract the tag from the first frame and search a database storing a plurality of prediction models for the prediction model associated with the tag. Upon identification of the prediction model associated with the tag, the central hub may run the prediction model on the first frame. When the prediction model identifies the defective characteristic, the central hub may receive an output from the prediction model that identifies the defective characteristic in the object and a classifier associated with the defective characteristic. When the prediction model does not identify the defective characteristic, no output may be generated.

After receipt of the output, the central hub may transmit to the smart glasses device an instruction to trigger an augmented reality display to a smart glasses user. The instruction may be compiled in a second data packet. In some embodiments the second data packet may also include the classifier.

In response to receipt of the instruction from the central hub, the smart glasses device may display the augmented reality display to the smart glasses user. The augmented reality display may overlay the boundary on the object. When the classifier is included in the second data packet, the display may also position natural language associated with the classifier adjacent the boundary in the augmented reality display.

After the object is overlaid with the boundary by the display, the microprocessor may search the plurality of second frames for the gesture. The gesture may indicate the data synchronization. The gesture and data synchronization may have more or more features of gestures and data synchronization described herein.

In response to identifying the gesture, the smart glasses may transmit a notification to the central hub confirming the receipt of the gesture. The transmission may be a third data packet. In response to receipt, by the central hub, of the third data packet, the central hub may update the training data in the database to include the first frame to create new training data and re-train the prediction model with the new training data as described herein.

Bifurcating analysis of the first frame between the IoT device and the central hub provides preprocessing on the IoT device, the preprocessing including the object detection, and supports in depth machine learning on the central hub via running and updating the prediction models. This bifurcation pushes complex processes to the central hub which has greater storage and processing speeds than the IoT device, while leveraging the smart glasses to perform onsite image recognition.

In some embodiments, the smart glasses user may trigger the video camera to start recording when he enters a building to perform an appraisal review on the building. The trigger may be the depression of a button on the smart glasses, an audio command, or a gesture. The smart glasses user may then terminate the video recording when the appraisal has been completed by a second trigger. During the video recording, some or all of the frames captured by the video camera may be processed as the first frame is processed in accordance with the invention.

In some embodiments, the video may be stored on the smart glasses. Each time a defective characteristic is identified by the systems and methods described herein, the smart glasses may tag the video with a time at which the defective characteristic was identified, and, in some embodiments, natural language text that describes the defective characteristic. When the video has finished recording, the smart glasses may transmit the video with the tags to the remote server. In some embodiments, each frame that was identified to have one or more defective characteristics may also be compiled and sent to the remote server when the video has finished recording. Text may be included in the transmission, such as "Seepage at 1:21, Cracked Wall at 2:35, Damaged Carpet at 4:53." A compilation of images, or frames, each image or frame including a defective characteristic, may also be included in the transmission.

In some embodiments, video may be streamed to remote server. The remote server may process the data and tag the video with the times at which defective characteristics were identified by the remote server using systems and methods described herein.

In some embodiments, the tagged video may be appended to an electronic mortgage application. In some embodiments, the frames in which defective characteristics were identified may be appended to a mortgage application.

In some embodiments, each defective characteristic may be associated with a depreciation value at a remote server database. When the recording of the video is complete, the depreciation values may be applied to a value of a house featured in the video. Each defective characteristic may be associated with a unique depreciation value. For example, a cracked window may result in a $500 reduction in price, whereas a damaged roof may result in a $5000 depreciation in price.

The remote server may identify the house featured in the video by retrieving GPS data captured by the smart glasses during the recording of the video. The GPS data may include sets of coordinates. The remote server may identify a home address located at the sets of coordinates included in the GPS data.

The smart glasses may include a moisture sensor. In some of these embodiments, the detection of a defective characteristic may be triggered when both a wet carpet has been identified by the prediction model and the moisture sensor measures a concentration of moisture in the air above a threshold value.

The smart glasses may include a sunlight sensor. The sunlight sensor may correlate a time of day with an amount of sunshine expected to be in a home. When the object detection module recognizes a window, the sunlight sensor may be activated to measure an amount of sunlight in a room. The presence of a window, coupled with the sunlight sensor's measurement of no sunlight in the room, may together comprise a defective characteristic and may be processed as described herein.

The smart glasses may include a GPS position and elevation tracker. The remote server may store a floor layout plan of a home. In some embodiments, the smart glasses may pull the floor layout plan from the remote server. In some of these embodiments, the apparatus may track the movement of the smart glasses through the home and correlate the movement with the floor layout plan. The smart glasses may keep a record of each room that the smart glasses entered. If the video recording is terminated prior to the smart glasses entering one or more of the rooms included in the floor layout plan, the smart glasses may transmit a notification to the remote server and/or to the smart glasses user listing rooms which were not examined.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Smart glasses 101, smart glasses 203, smart glasses 302, smart glasses including features 404 and 402, and smart glasses 504 may have one or more features in common with the smart glasses described herein. Additionally, features of smart glasses described in connection with FIGS. 1-5 may be included in the smart glasses described herein.

Figure 1:
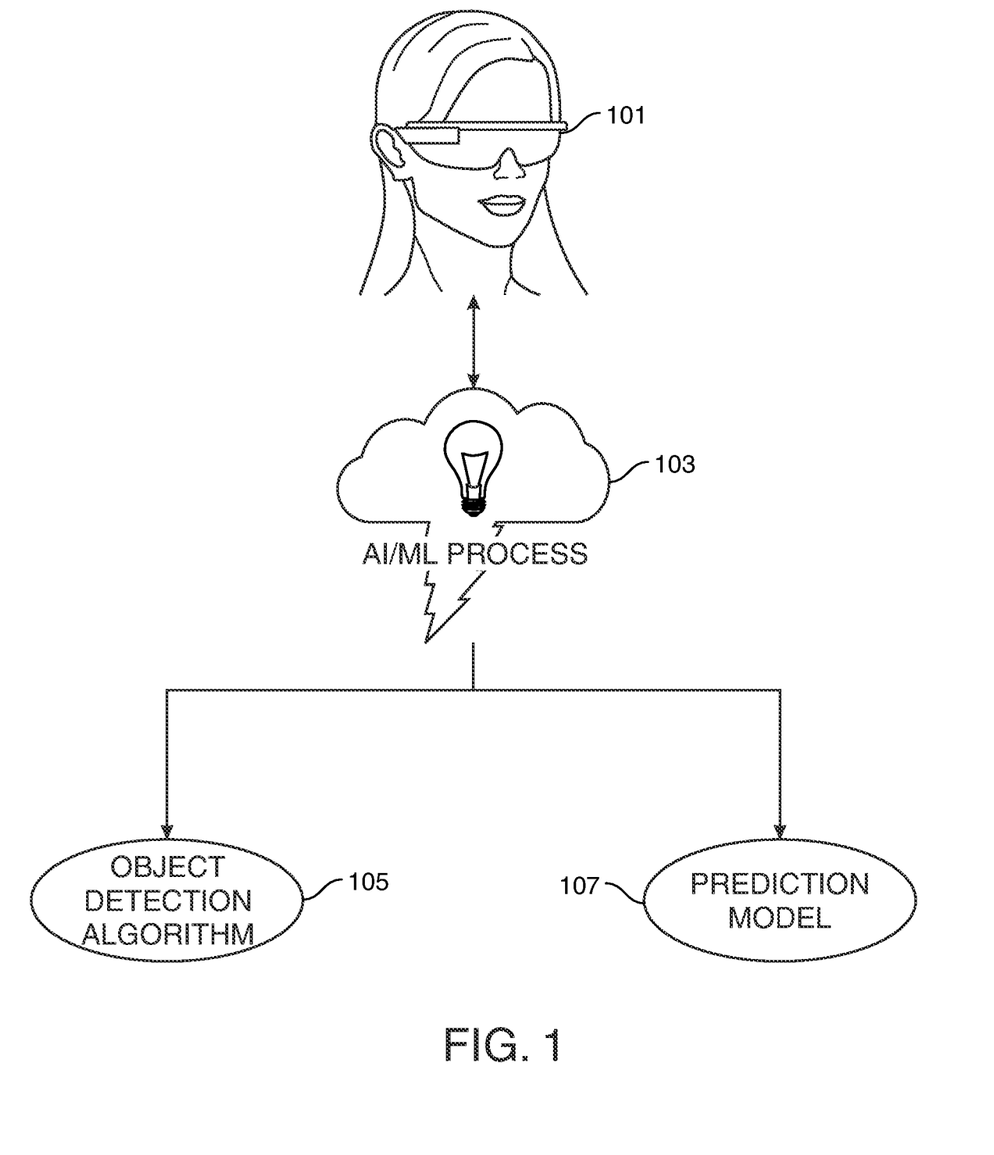
FIG. 1 shows illustrative apparatus and methods in accordance with the invention.

FIG. 1 shows illustrative apparatus and methods in accordance with the invention. In FIG. 1, a smart glasses user is shown wearing smart glasses 101. Smart glasses 101 is shown executing AI/ML process 103. AI/ML process 103 may include executing object detection algorithm 105. AI/ML process 103 may additionally, or alternately, include executing prediction model 107.

Object detection algorithm 105 may be executed on smart glasses 101 or on a remote server. Prediction model 107 may be executed on smart glasses 101 or on a remote server.

The smart glasses and the remote server may comprise one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

The smart glasses and the remote server may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the smart glasses and the remote server may be stored within the non-transitory memory and/or other storage medium. Software applications may provide instructions to the processor that enable the apparatus to perform various functions. The instructions may include any of the AI methods and processes described herein. For example, the non-transitory memory may store software applications such as object detection algorithms and prediction models. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The smart glasses and the remote server may be part of two or more networks. The smart glasses and the remote server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the smart glasses and the remote server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

Figure 2:
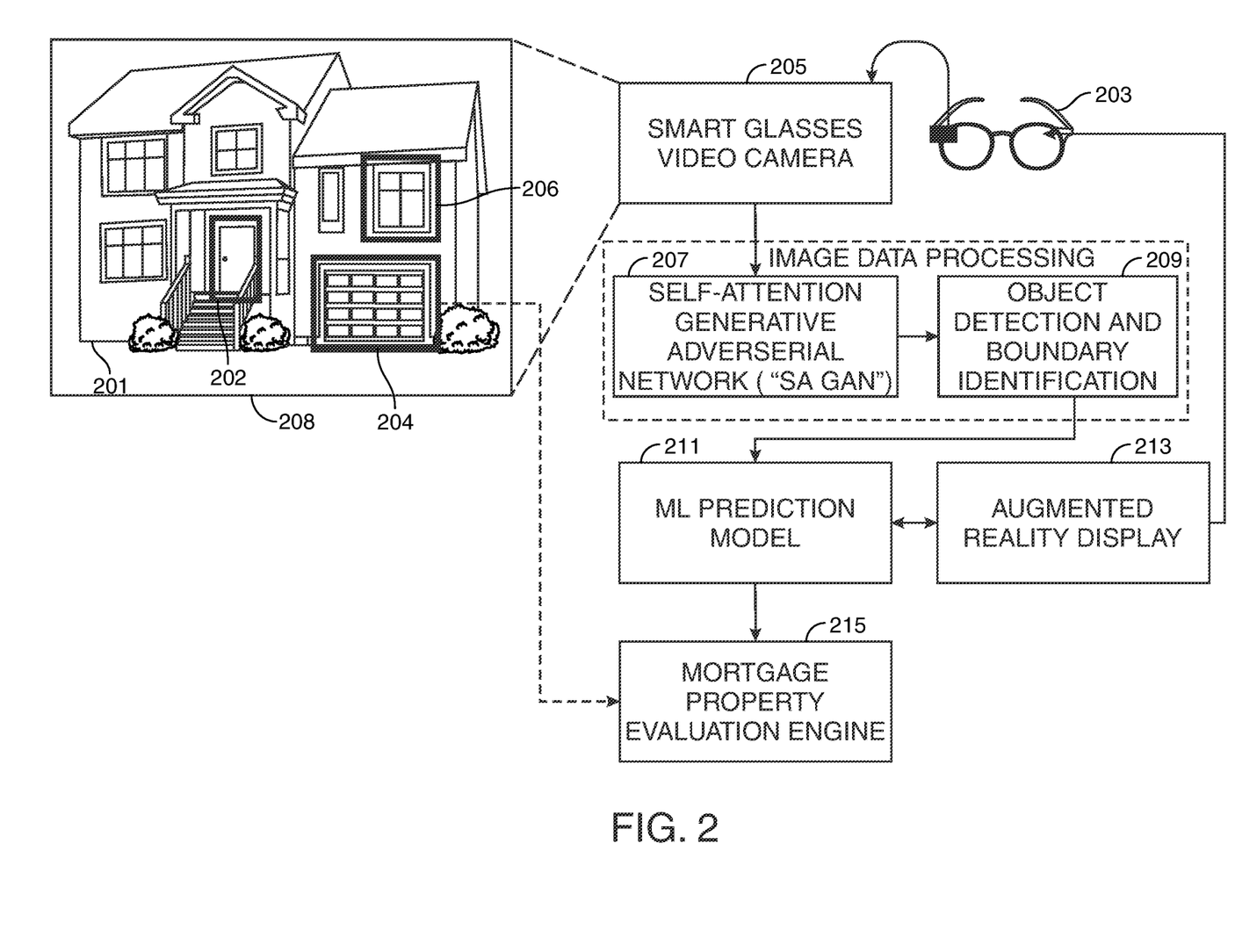
FIG. 2 shows illustrative apparatus and methods in accordance with the invention.

FIG. 2 shows illustrative apparatus and methods in accordance with the invention. In FIG. 2, smart glasses 203 are shown including smart glasses video camera 205 (referred to alternately herein as "video camera 205"). Video camera 205 is shown capturing frame 208. Frame 208 includes house 201.

The illustrative methods in FIG. 2 include video camera 205 transmitting frame 208 to Self-Attention Generative Adversarial Network ("SA GAN") 207. SA GAN 207 may output object detection and boundary identification 209, including the detection of one or more objects included in frame 208 and boundaries surrounding each of the detected objects. In FIG. 2, SA GAN 207 has detected a window, a garage door and a door. The window is determined to be a portion of frame 208 circumscribed by boundary box 206. The garage door is determined to be a portion of frame 208 circumscribed by boundary box 204. The door is determined to be a portion of frame 208 circumscribed by boundary box 202.

The methods may include feeding the detected objects to ML prediction model 211. ML prediction model 211 may be stored in a database comprising a plurality of prediction models. Each prediction model may be trained with a set of training data for identifying a defect in an object.

In some embodiments, ML prediction models may be run on frame 208 to detect one or more defective characteristics of objects in frame 208. In some embodiments, the images in the boundary boxes may be extracted and each extracted image may be fed to the ML prediction models. In some embodiments, each image may be tagged with an image classifier by SA GAN 207. For example, the window may be tagged with a window classifier ID number. In some of these embodiments, only the ML prediction models associated with the window classifier ID number may be run on the image circumscribed by boundary box 206. A database in smart glasses 203 may store ML prediction model 211 and associate ML prediction model 211 with one or more classifiers. Only running ML prediction models 211 on images with the associated classifiers may save processing power by, for example, not running a prediction model trained to detect cracks in a window on an image for which SA GAN 207 has not detected any windows.

Output generated by ML prediction model 211 may be fed to augmented reality display 213. Exemplary output may include image classifiers of the image(s) identified by SA GAN 207 which have been determined to have one or more defective characteristics by ML prediction model 211. Augmented reality display 213 may generate an augmented reality display on smart glasses 203 which highlights, or otherwise draws the attention of the smart glasses user to the images having the defective characteristics.

The output of ML prediction model 211 may be transmitted, via an internet connection, from smart glasses 203 to a remote server. The remote server may host mortgage property evaluation engine 215. Mortgage property evaluation engine 215 may use the output of ML prediction model 211 to modify a mortgage application, an appraisal report, or any other report as described herein.

Figure 3:
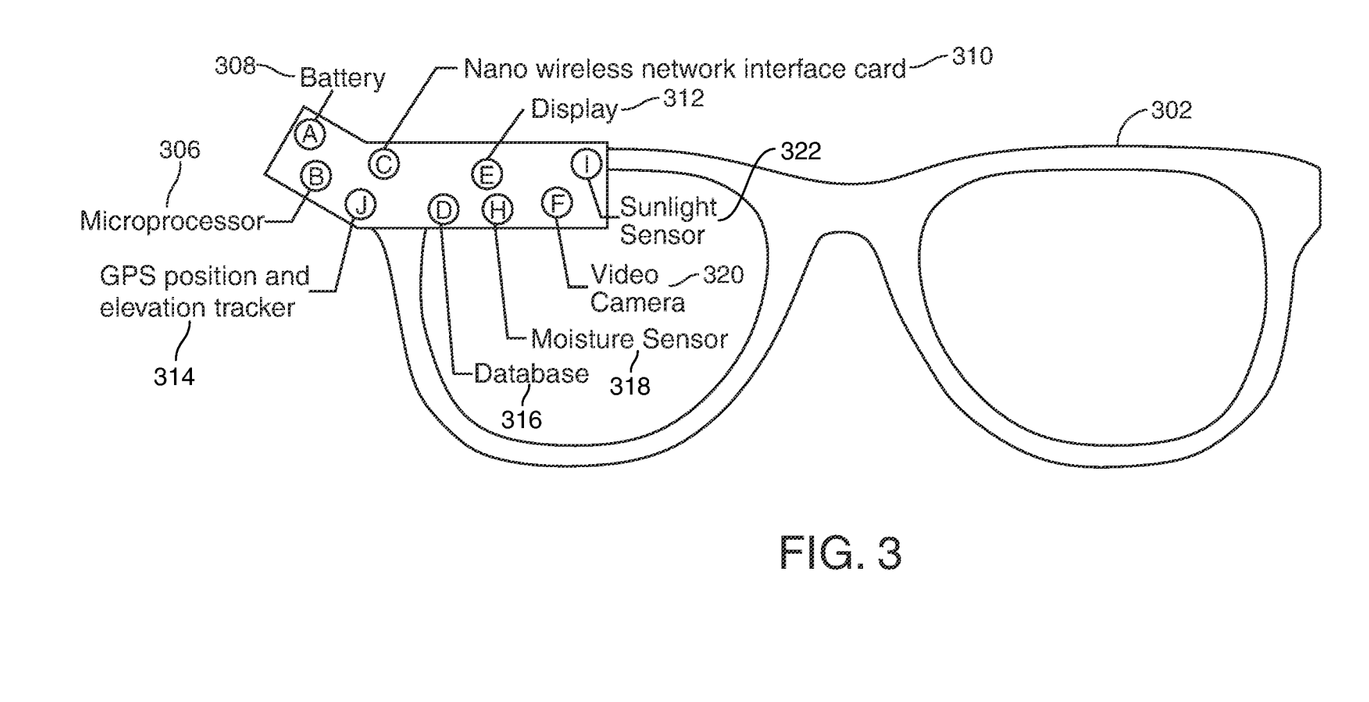
FIG. 3 shows illustrative apparatus in accordance with the invention.

FIG. 3 shows illustrative smart glasses 302 in accordance with the invention. Illustrative smart glasses 302 may include hardware components embedded in smart glasses 302. The hardware components may include one, two, some, or all of hardware components A-J illustrated in FIG. 3, and, in some embodiments, additional hardware components not included in FIG. 3 but described herein. The hardware components may have functionalities described herein.

Hardware components may include battery 308 shown at A. Battery 308 may power the other components of smart glasses 302, such as the display and the microprocessor.

Hardware components may include microprocessor 306 shown at B. Microprocessor 306 may execute processing within smart glasses 302, such as object detection algorithms and/or prediction models.

Hardware components may include GPS position and elevation tracker 314 shown at J. GPS position and elevation tracker 314 may track a GPS position of the smart glasses and an elevation of smart glasses 302.

Hardware components may include nano wireless network interface card 310 shown at C. Nano wireless NIC 310 may establish communication with a nearby wireless network. The wireless network may be used to communicate with the remote server.

Hardware components may include display 312 shown at E. Display 312 may display software-based displays to the user, such as augmented reality displays.

Hardware components may include sunlight sensor 322 shown at I. Sunlight sensor 322 may monitor an amount of sunlight in a location proximal to smart glasses 302.

Hardware components may include video camera 320 shown at F. Video camera 320 may be operable to record a video. The video may record the view of smart glasses 302. The video may be stored in database 316. The video may be streamed to the remote server and not stored in database 316. The video may include multiple frames.

Hardware components may include moisture sensor 318 shown at H. Moisture sensor 318 may measure a concentration of moisture in air surrounding smart glasses 302.

Hardware components may include database 316 shown at D. Database 316 may store data such as the prediction model, training data and/or the object detection algorithm.

Figure 4:
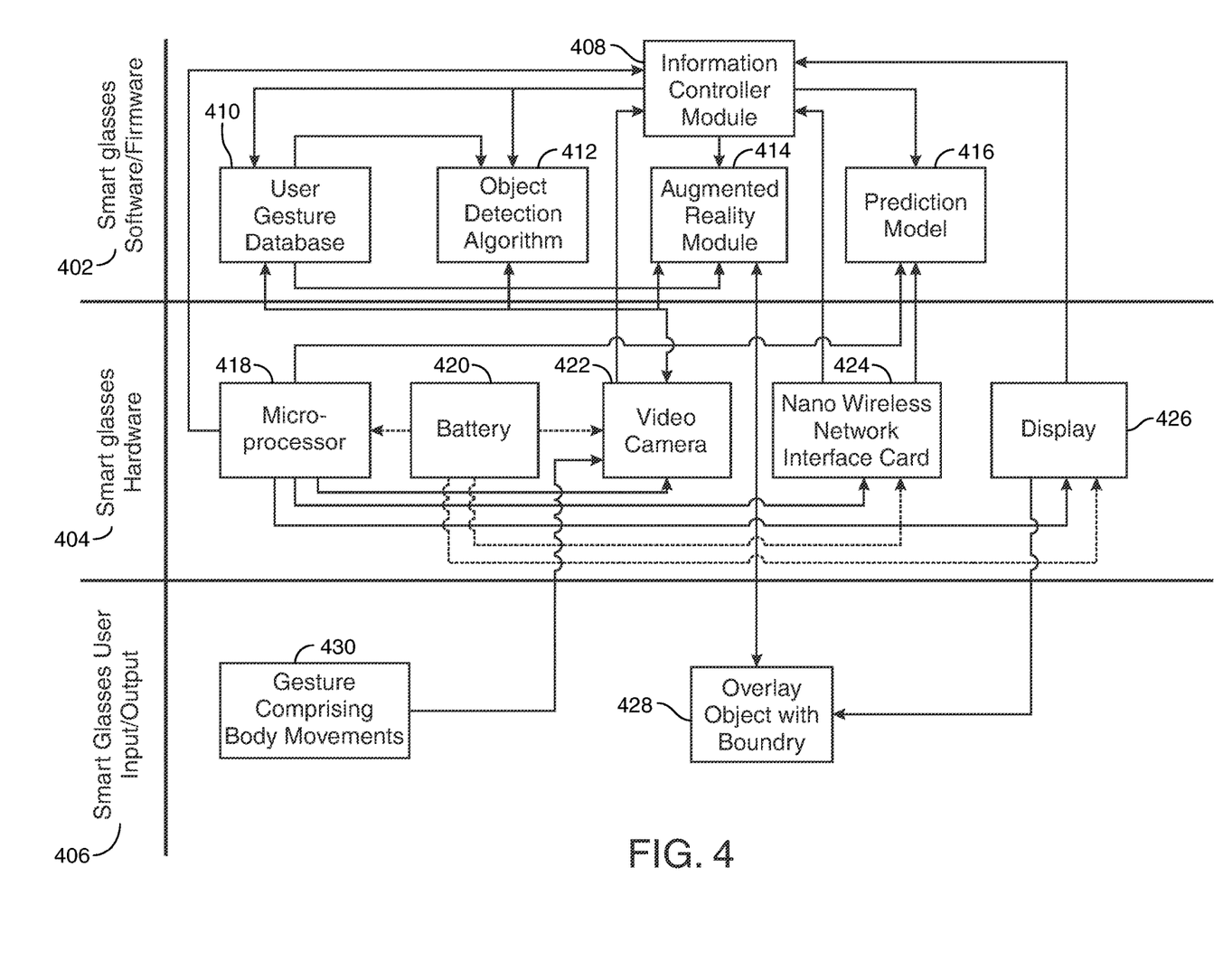
FIG. 4 shows illustrative apparatus and methods in accordance with the invention.

FIG. 4 shows exemplary apparatus and methods in accordance with the invention. In FIG. 4, Smart Glasses Hardware 404, Smart Glasses Software/Firmware 402 and Smart Glasses User Input/Output 406 are illustrated, together with interrelationships between them. Additional connections between Smart Glasses Hardware 404 and Smart Glasses Software/Firmware 402 may be included in embodiments of the invention. In some embodiments, connections between Smart Glasses Hardware 404 and Smart Glasses Software/Firmware 402 may not be supported.

Smart Glasses Hardware 404 may include microprocessor 418, battery 420, video camera 422, nano wireless network interface card 424 and display 426. Smart Glasses Software/Firmware may include user gesture database 410, object detection algorithm 512, augmented reality module 414, prediction model 416 and information controller module 408.

Object detection algorithm 412 may detect objects in a frame captured by video camera 422. User gesture database 410 may be used to search a plurality of frames captured by video camera 422 to determine if a gesture comprising body movements was captured by video camera 422. User gesture database 410 may store a plurality of gestures, each gesture including different body movements. Each gesture may correspond to a different 'command' or 'input' being provided by the smart glasses user to the smart glasses. User gesture database 410 may be fed a gesture comprising body movements 430 captured by video camera 422. User gesture database 410 may correlate video data, such as a plurality of second frames, captured by video camera 422 with a gesture stored in user gesture database 410 using a prediction algorithm trained to identify the gesture. The training may include feeding a generic algorithm with a plurality of video data, each video data including the gesture, to create a prediction algorithm trained to identify the gesture.

Prediction model 416 may process frames, or part of frames (such as extracted objects) captured by video camera 422 to determine if the processed image includes one or more defective characteristics. Augmented reality module 414 may trigger the overlay object with boundary 428 with a boundary identified by object detection algorithm 412.

Microprocessor 418 may control information controller module 408. Information controller module 408 may control flows of information between user gesture database 410, object detection algorithm 412, augmented reality module 414 and prediction model 416. Information controller module may compile data packets for transfer to the remote server via nano wireless network interface card 424. In some embodiments, microprocessor 418 may directly control each of between user gesture database 410, object detection algorithm 412, augmented reality module 414 and prediction model 416 without information controller module 408.

Figure 5:
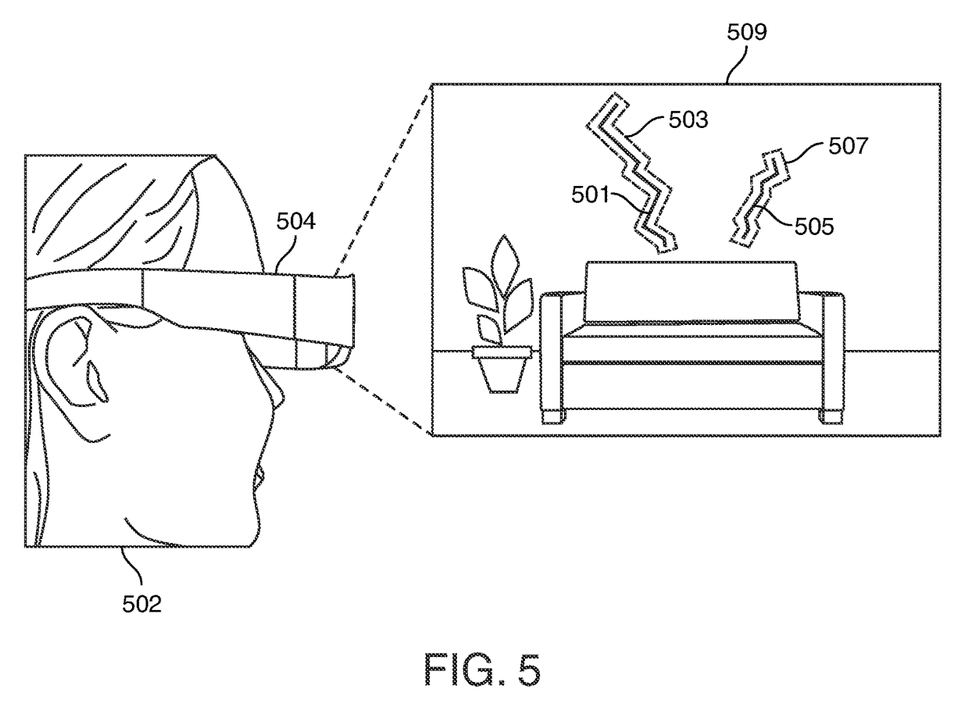
FIG. 5 shows an illustrative apparatus and methods in accordance with the invention.

FIG. 5 shows illustrative apparatus and methods in accordance with the invention. In FIG. 5, smart glasses user 502 is shown wearing smart glasses 504. Frame 509 represents a view of smart glasses user 502 through smart glasses 504. Frame 509 additionally represents frame 509 of a video captured by a video camera embedded in smart glasses 504.

In FIG. 5, frame 509 is an augmented reality display. The augmented reality display includes crack 501 and crack 505 which are part of the physical reality surrounding smart glasses user 502. The augmented reality display also includes boundary 503 surrounding crack 501 and boundary 507 surrounding crack 505. Boundaries 503 and 507 are not part of the physical reality surrounding smart glasses user 502. Instead, boundaries 503 and 507 are overlaid on the view of smart glasses user 502 by a display embedded in smart glasses 504.

Boundaries 503 and 507 are used to direct the attention of smart glasses user 502 to the defective characteristics of the property he is viewing. Boundaries 503 and 507 may be displayed to smart glasses user 502 after the prediction model has determined that cracks 501 and 505 are defective characteristics of the wall displayed in frame 509.

Thus, systems and methods for leveraging smart glasses for real estate evaluations are provided. Persons skilled in the art will appreciate that the present invention can be practiced by other than the described embodiments, which are presented for purposes of illustration rather than of limitation.

What is claimed is:

1. A smart glasses device for executing a prediction model on video data captured by the smart glasses device and for retraining the prediction model in response to a data synchronization between an output of the prediction model and a gesture captured by the smart glasses device, the smart glasses device comprising:

a video camera operable to record a video including a first frame and a plurality of second frames;

a database storing the prediction model and training data, the prediction model identifying a defective characteristic in an object;

a microprocessor operable to receive the first frame from the video camera and to process the first frame, the processing comprising:
  executing an object detection algorithm on the first frame to detect the object in the first frame;
  identifying the object and a boundary circumscribing the object in the first frame using the object detection algorithm;
  running the prediction model on the first frame to identify the defective characteristic in the object; and
  when the defective characteristic is identified by the prediction model:
    receiving an output from the prediction model, the output including a classifier associated with the defective characteristic; and
    instructing a display to trigger an augmented reality display to a smart glasses user;

the display operable to trigger the augmented reality display, the augmented reality display circumscribing the object with the boundary;

after triggering the augmented reality display, the microprocessor being operable to:
  search the plurality of second frames for a gesture indicating the data synchronization, the gesture comprising body movements of the smart glasses user, wherein the data synchronization is a confirmation of an accuracy of the output of the prediction model; and
  in response to identifying the gesture:
    compile a data packet for transfer to a remove server via an internet connection, the data packet including the first frame, the boundary overlaid on the object in the first frame, a time at which the video camera captured the first frame and the classifier;
    update the training data in the database to include the first frame, wherein updating the training data creates new training data based on the identifying the gesture in the plurality of second frames; and
    re-train the prediction model with the new training data;

a nano wireless network interface card, said nano wireless network interface card for establishing communication with a wireless network and being operable to transmit the data packet over the wireless network to a remote server; and a battery, said battery operable to power the video camera, the microprocessor, the display and the nano wireless network interface card.

2. The smart glasses device of claim 1 wherein the classifier is natural language describing the defective characteristic.

3. The smart glasses device of claim 2 wherein the display is further operable to display the natural language adjacent the boundary in the augmented reality display.

4. The smart glasses device of claim 1 wherein the object is a wall, the defective characteristic is a crack in the wall and the training data includes a plurality of images of cracks in walls.

5. The smart glasses device of claim 1 wherein the body movements are movements of an arm.

6. The smart glasses device of claim 1 wherein the compiling the data packet includes using facial recognition technology identify a face in the first frame and to blur the face in the first frame.

7. The smart glasses device of claim 1 wherein the data packet stores the first frame in read-only mode.

8. An Internet of Things ("IoT) system comprising a central hub and an IoT node, the IoT node being a smart glasses device, the IoT system being configured to retrain a prediction model in response to a data synchronization between an output of the prediction model and a gesture captured by the smart glasses device, the IoT system comprising:
  the smart glasses device supporting an internet connection and being configured to:
    record a video using a video camera embedded in the smart glasses device, the video including a first frame and a plurality of second frames;
    process the first frame using tiny machine learning ("ML"), the tiny ML including executing an object detection algorithm on the first frame to detect an object in the first frame;
    identify the object and a boundary circumscribing the object in the first frame using the object detection algorithm; and
    compile a data packet for transfer to the central hub via the internet connection, the data packet including the first frame, a tag tagged to the first frame identifying the object, and a time at which the video camera captured the first frame;
  the central hub configured to:
    store the prediction model and training data, the prediction model being configured to identify a defective characteristic in the object and being associated with the tag;
    upon receipt of the first frame, extracting the tag from the first frame and searching a database storing a plurality of prediction models for the prediction model associated with the tag;
    run the prediction model on the first frame;
    when the prediction model identifies the defective characteristic, receiving an output from the prediction model identifying the defective characteristic in the object and a classifier associated with the defective characteristic; and
    transmit to the smart glasses device an instruction to trigger an augmented reality display to a smart glasses user;
  the smart glasses device being further configured to:
    in response to receipt of the instruction from the central hub, display the augmented reality display to the smart glasses user, the augmented reality display overlaying the boundary on the object;
    after the object is overlaid with the boundary by the display, search the plurality of second frames for a gesture indicating the data synchronization, the gesture comprising body movements of the smart glasses user, wherein the data synchronization is a confirmation of an accuracy of the output of the prediction model; and
    in response to identifying the gesture, transmitting a notification to the central hub confirming the receipt of the gesture; and
  the central hub being further configured to:
    receive the notification from the smart glasses device;
    update the training data in the database to include the first frame, wherein updating the training data creates new training data based on the identifying the gesture in the plurality of second frames; and
    re-train the prediction model with the new training data;

wherein bifurcating analysis of the first frame between the smart glasses device and the central hub provides preprocessing on the smart glasses device and supports in depth machine learning on the central hub, the central hub having greater storage and processing speeds than the smart glasses device.

9. The IoT system of claim 8 wherein the object detection algorithm is a Self-Attention Generative Adversarial Network ("SA GAN").

10. The IoT system of claim 8 wherein the object detection algorithm is configured to detect a plurality of objects, the plurality of objects including the object.

11. The IoT system of claim 8 wherein the classifier is natural language describing the defective characteristic.

12. The IoT system of claim 11 wherein:
the central hub is further configured to transmit to the smart glasses device the classifier together with the instruction to trigger the augmented reality display; and
the display is further configured to position the natural language adjacent the boundary in the augmented reality display.

13. The IoT system of claim 8 wherein the object is a wall, the defective characteristic is a crack and the training data includes a plurality of images of wall cracks.

14. The IoT system of claim 8 wherein the body movements are movements of an arm.

15. The IoT system of claim 8 wherein the compiling the data packet includes using facial recognition technology identify a face in the first frame and to blur the face in the first frame.

16. The IoT system of claim 8 wherein the data packet stores the first frame in read-only mode.

17. A smart glasses device for executing a prediction model on video data captured by the smart glasses device and for retraining the prediction model in response to a data synchronization between an output of the prediction model and a gesture captured by the smart glasses device, the smart glasses device comprising:
a video camera operable to record a video including a first frame and a plurality of second frames;
a database storing the prediction model, the prediction model being configured to identify a defective characteristic in an object;
a microprocessor operable to receive the first frame from the video camera and to process the first frame, the processing comprising:
executing an object detection algorithm on the first frame to detect the object in the first frame;
identifying the object and a boundary circumscribing the object in the first frame using the object detection algorithm;
running the prediction model on the first frame, the running including applying the prediction model to the first frame to identify the defective characteristic in the object;
when the prediction model identifies the defective characteristic in the object, receiving an output from the prediction model, the output including a classifier associated with the defective characteristic identified by the prediction model; and
instructing a display to trigger an augmented reality display to a smart glasses user;
the display operable to trigger the augmented reality display to the smart glasses user, the augmented reality display positioning the boundary such that it circumscribes the object;
after the object is circumscribed by the boundary, the microprocessor being operable to:
search the plurality of second frames for a gesture indicating the data synchronization, the gesture comprising body movements of the smart glasses user, wherein the data synchronization is a confirmation of an accuracy of the output of the prediction model; and
in response to identifying the gesture, compile a data packet for transfer to a remove server via an internet connection, the data packet including the first frame, a time at which the video camera captured the first frame, and the classifier;
a nano wireless network interface card, said nano wireless network interface card for establishing communication with a wireless network and being operable to transmit the data packet over the wireless network to a remote server; and
a battery, said battery operable to power the video camera, the microprocessor, the display and the nano wireless network interface card.

18. The smart glasses device of claim 17 wherein:
the remote server stores the prediction model and training data; and
the data packet further comprises an instruction to the remote server to retrain the prediction model using stored on the remote server using the first frame.

19. The smart glasses device of claim 18 wherein the microprocessor is further configured to:
receive from the remote server an updated prediction model; and
update the prediction model stored on the smart glasses device with the updated prediction model.

20. The smart glasses device of claim 19 wherein the smart glasses device does not store training data for the prediction model.

* * * * *